United States Patent [19]
Steidel et al.

[11] Patent Number: 6,137,900
[45] Date of Patent: Oct. 24, 2000

[54] METHOD AND DEVICE FOR DETECTING LIQUID CONTAINERS

[75] Inventors: Tom Steidel, Asker; Andreas Nordbryhn; Lennart Flem, both of Oslo, all of Norway

[73] Assignee: Tomra Systems Asa, Asker, Norway

[21] Appl. No.: 08/973,152

[22] PCT Filed: Jul. 10, 1997

[86] PCT No.: PCT/NO97/00179

§ 371 Date: Dec. 1, 1997

§ 102(e) Date: Dec. 1, 1997

[87] PCT Pub. No.: WO98/02256

PCT Pub. Date: Jan. 22, 1998

[30] Foreign Application Priority Data

Jul. 12, 1996 [NO] Norway .................................. 962949

[51] Int. Cl.[7] .............................. G06K 9/00; G06M 7/00; G01N 9/04; H04N 9/47
[52] U.S. Cl. ........................... 382/142; 250/223; 348/127
[58] Field of Search .................................. 382/142, 141, 382/151; 209/522, 523, 524, 529, 530; 250/223 B; 198/395, 398

[56] References Cited

U.S. PATENT DOCUMENTS

| 5,007,096 | 4/1991 | Yoshida | 382/142 |
| 5,150,307 | 9/1992 | McCourt et al. | 364/478 |
| 5,443,164 | 8/1995 | Walsh et al. | 209/580 |
| 5,675,516 | 10/1997 | Bone et al. | 364/562 |
| 5,692,029 | 11/1997 | Husseiny et al. | 378/88 |

*Primary Examiner*—Leo H. Boudreau
*Assistant Examiner*—Shawn B. Cage
*Attorney, Agent, or Firm*—Rodman & Rodman

[57] ABSTRACT

In a reverse vending apparatus for detecting containers, e.g., bottles of glass or plastic, or packaging made of metal, wood, glass or plastic which for the recycling of materials or reuse of the container are inserted in the machine and conveyed past a detector station containing a video camera, a video image analyser (125, 130) is connected to the video camera in order to analyse the video image whilst the container (B) is conveyed in lying position and with its axis parallel to the direction of transport past the video camera (109). The video analyser (125) contains a calculator component (130) for determining, when the container moves into the video image, whether the container enters the detection zone (video image) mouth (B1) (e.g., top portion or neck of bottle) (FIG. 3b) first or bottom (B2) (FIG. 3c) first, and a control component (130) which causes the container to be fed back to a container insertion portion of the apparatus if the container comes mouth first, and which has a signalling means for signalling to the apparatus user to turn the container (B) so that it is inserted bottom first when reinserted, or causes the container to be fed on to a discharge station if it comes bottom first. The analyser may moreover contain one or more of the following pieces of supplementary equipment: a container position detector (131), a container shape calculation circuit (132), a colour determination circuit (133), a "best analysis image" circuit (136), a bar code reader (134) and a detector (138) for determining whether the container contains residual liquid or another substance.

38 Claims, 13 Drawing Sheets

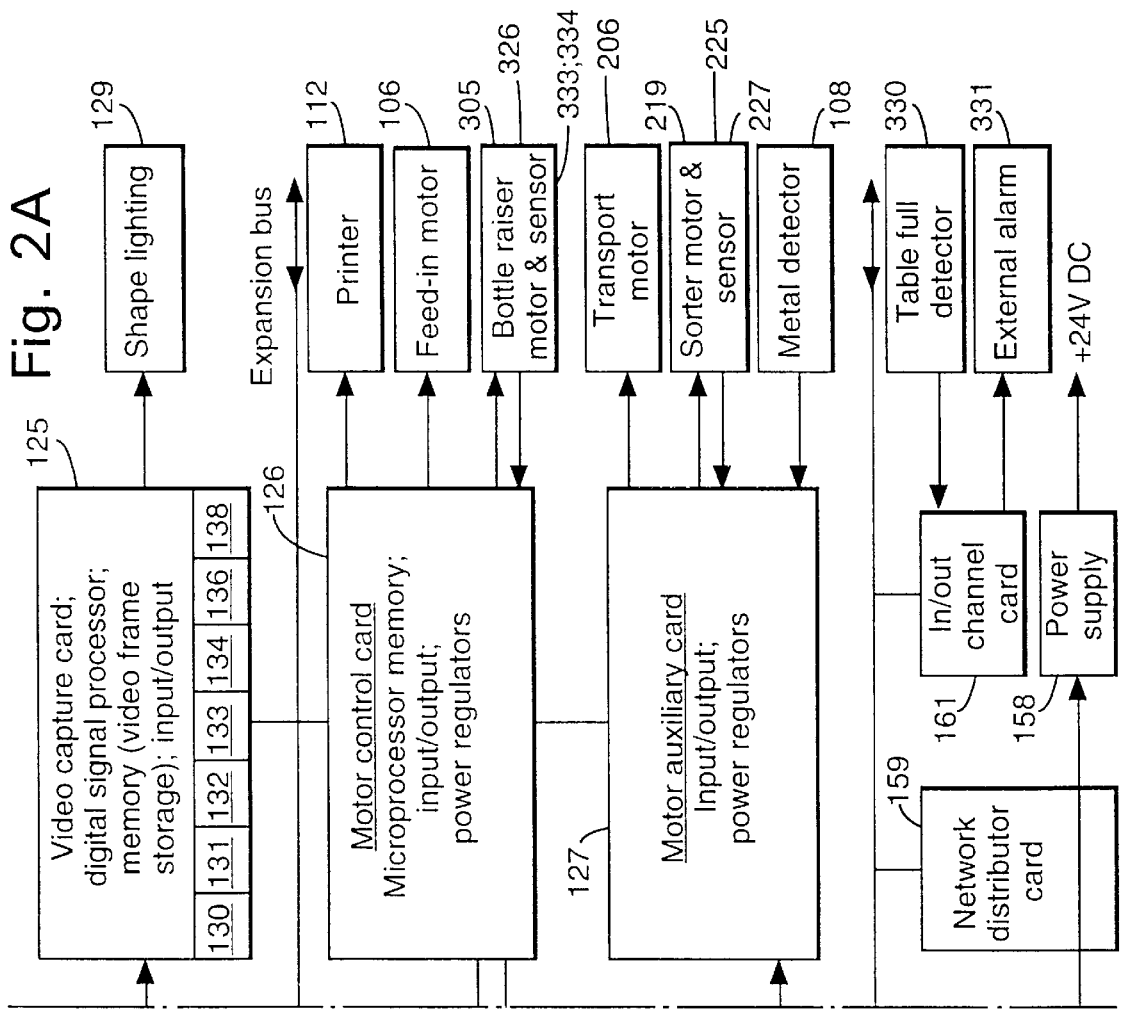

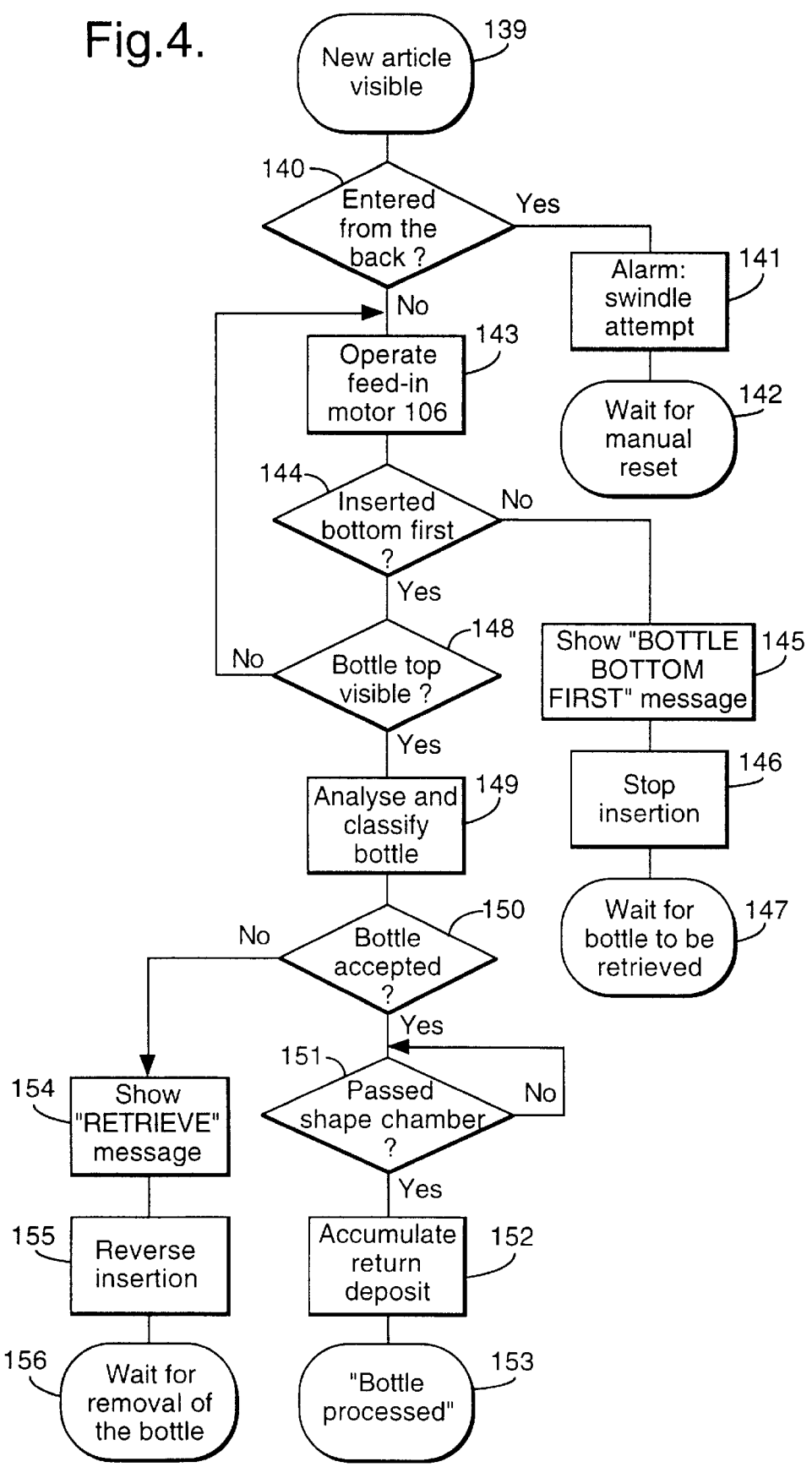

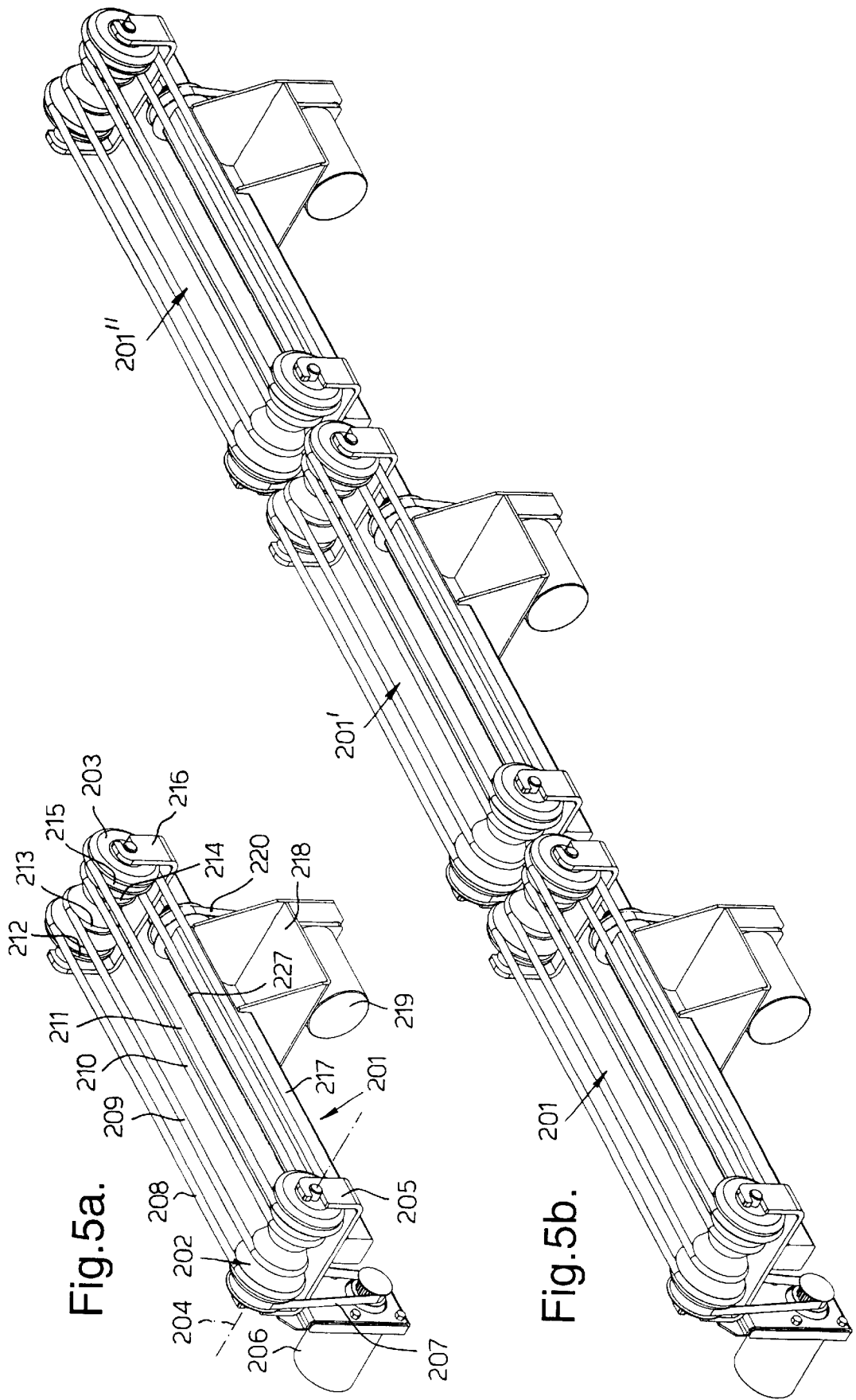

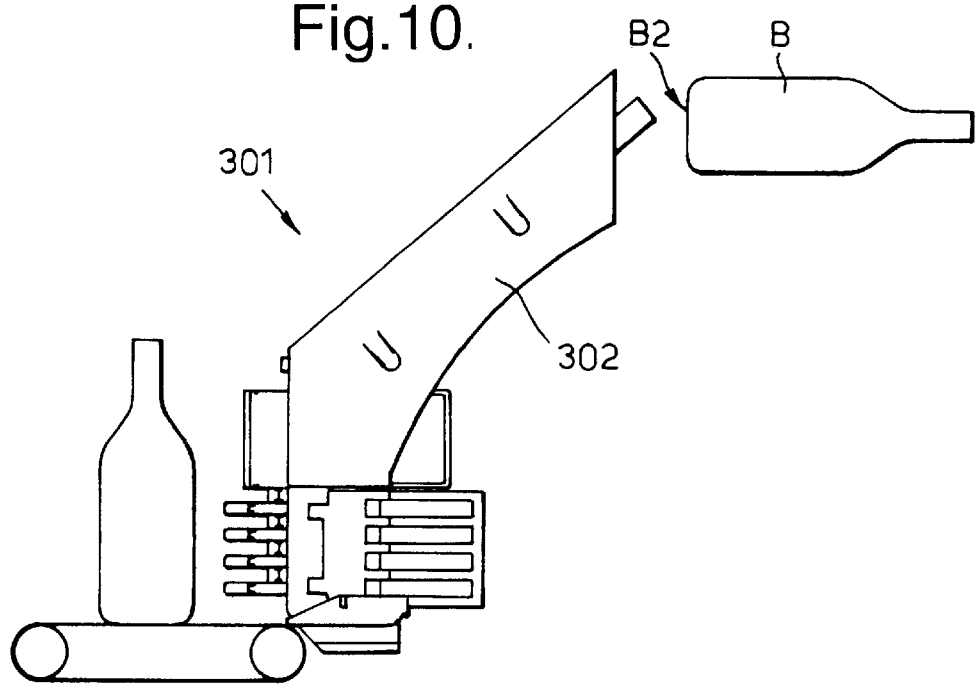
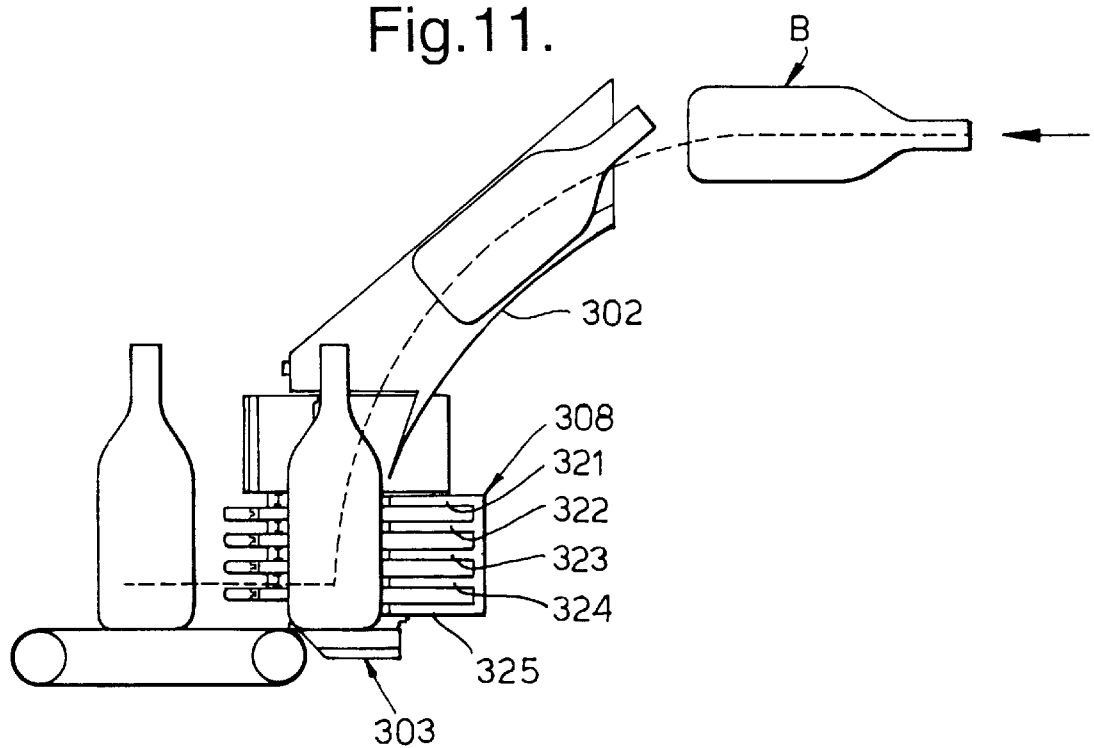

METHOD AND DEVICE FOR DETECTING LIQUID CONTAINERS

BACKGROUND OF THE INVENTION

The present invention relates to a method and a device for detecting containers, e.g., bottles of glass or plastic, or cans made of metal, wood, glass or plastic, which for the recycling of materials or reuse of the container, are transported in a lying position and with their axis parallel to the direction of transport past a detection zone associated with a detector station containing a video camera, a video image analysis of the container being carried out.

It is previously known to view containers with the aid of a video camera, such as described, e.g., in U.S. Pat. No. 4,625,107, where the object is to measure in particular the width of the container.

However, the object of the present invention is to solve the problems associated with detection of containers which are transported in lying position and where the manner in which the containers are inserted must be taken into consideration.

SUMMARY OF THE INVENTION

The object of the invention is therefore to provide technical solutions used for the detection of containers.

According to the invention the method is characterised by:

a) analysing a sequence of video images of the container whilst it is conveyed past the video camera; and b) determining the position and movement of the container in a viewing region of the video camera on the basis of continuous detection of the position and movement of the container in the video image; and/or determining, during the movement of the container, by means of the image of the container which moves into the detection zone (the video image) whether the container enters the video camera field of view either mouth first (e.g., top portion or neck of bottle) or bottom first, and causing the container to be fed back to a container insertion portion if it comes mouth first, and signalling the need to turn the container so that it is inserted bottom first when reinserted, or causing the container to be conveyed on to a discharge station if it comes bottom first.

On the basis of the video picture of the container, it will also be possible to calculate a characteristic expression of the shape of the container, e.g., contour, surface area in the video image, cross-section or the like.

It would be advantageous to be able to produce a colour video image of a container which is a bottle of plastic or glass, and determine the colour of the container in the video image based on the bottle'light transmittivity to light which is emitted in a cluster of wave lengths.

In order to ensure best possible analysis results, it is also advantageous to determine the most suitable video image with a view to recognition and identification of the container.

It will also be advantageous to scan continuously a field of the video image of the container to search for and register a bar code located on the container.

The invention may also conceivably be used to detect any longitudinal markings in the video image of a container which is a bottle, to emit a signal indicating that the container wholly or partly contains liquid or another substance, and possibly to return the container to the user for emptying prior to reinsertion.

To obtain a most unambiguous indication, it would be advantageous to weight the container, at the same time as a capacitance measurement is carried out.

In addition, it will be preferred to analyse whether the container is of a specific metal type, and this can be carried out using one or more known metal detectors.

According to the invention, the device is characterised in that a) the video image analyser is connected to the video camera in order to analyse a sequence of video images whilst the container is conveyed past the video camera, the video analyser containing:

b) a position detector for determining the position and movement of the container in a viewing region of vision of the video camera on the basis of continuous detection of the position and movement of the container in the video image, and/or a calculator component for determining, when the container moves into the detection zone (the video image), whether the container enters the video camera field of view mouth first (e.g., top portion or neck of bottle) or bottom first, and a control component which causes the container to be fed back to a container insertion portion if it comes mouth first, and which has a signalling means for signalling the need to turn the container so that it is inserted bottom first when reinserted, or causes the container to be fed on to a discharge station if it comes bottom first.

In the analyser there may also be included a container shape calculation circuit which on the basis of the video image of the container is adapted to calculate a characteristic expression of the shape of the container, such as its contour, surface area in the video image, cross-section or the like.

The analyser also contains a circuit which determines the best video image of the container with a view to recognition and identification.

It will also be advantageous to allow the video camera to be a colour video camera, especially when the container is a bottle of glass or plastic, a lighting unit being provided to illuminate the bottle. In this case, the analyser contains a colour determination circuit for establishing the colour of the container in the video image based on the bottle's light transmittivity to light which is emitted in a cluster of wave lengths.

Often, bar codes are characteristic for a container, and for this purpose the analyser may contain a bar code reader which is adapted to scan continuously a field of a video image in order to search for and register a bar code located on the container.

Insertion of bottles which have contents may cause problems. It is therefore advantageous to allow the analyser to contain a circuit which is adapted so that when it observes any longitudinal markings in the video image of a container which is a bottle it will emit a signal indicating that the bottle, wholly or partly, contains liquid. In addition, the container ought to be weighed by a load cell and measured with the aid of a capacitance meter.

In connection with the detector station there may be provided a metal detector that is known per se, especially to detect whether a can of a known metal is inserted.

BRIEF DESCRIPTION OF THE DRAWINGS

The invention will now be described in more detail with reference to the appended drawings.

FIG. 4 is a simplified flow chart for a part of the detector function, according to the invention.

FIG. 5a and FIGS. 6, 7, 8 and 9 show a preferred sorting device for use in a reverse vending apparatus as shown in FIG. 1.

FIG. 5b shows a variant of the sorting device for increased sorting potential.

FIGS. 10–21 show details in connection with a bottle raiser which is a part of the reverse vending apparatus according to the invention.

DETAILED DESCRIPTION OF THE DRAWINGS

Figure 1:
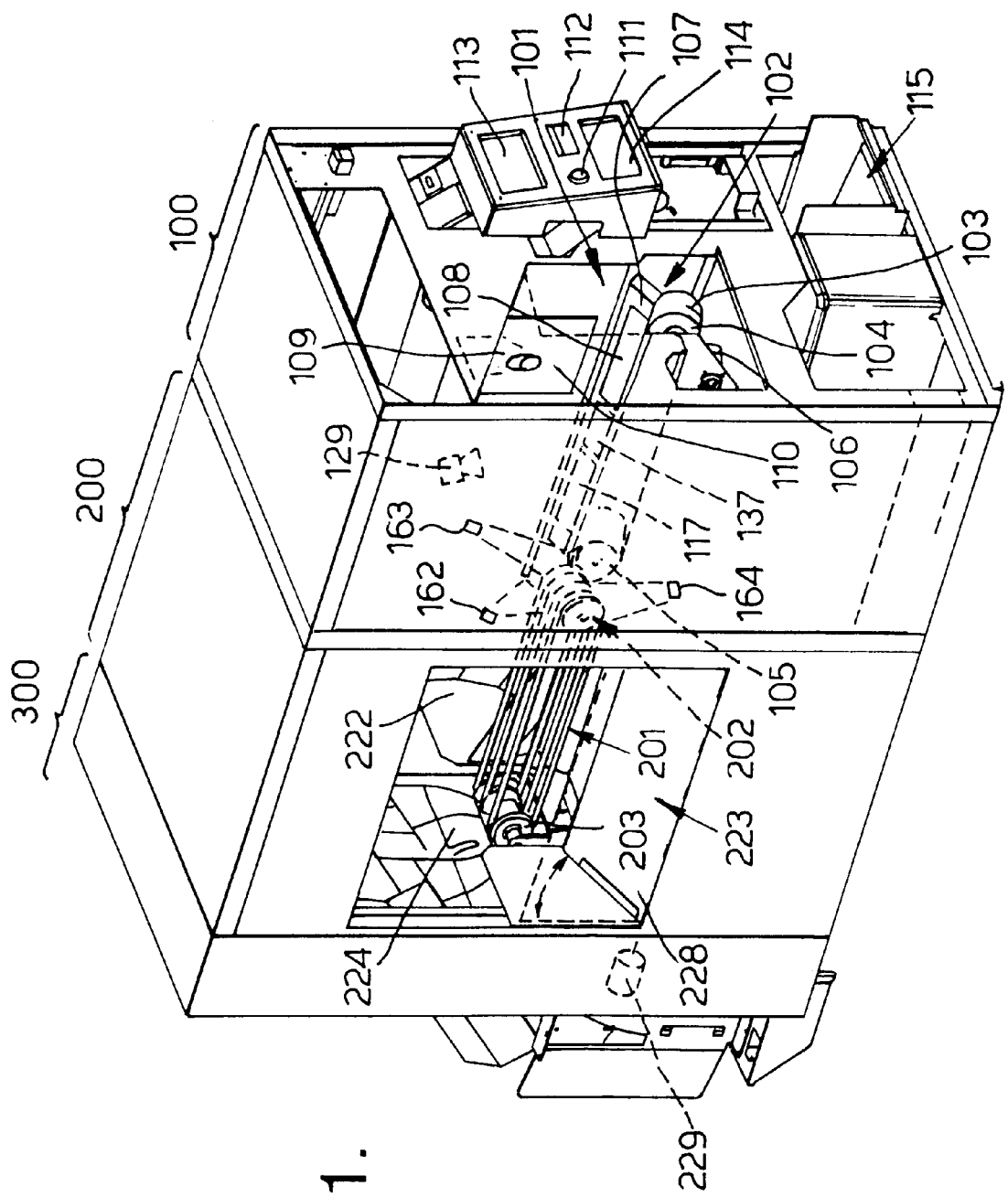
FIG. 1 shows a reverse vending apparatus for use with the present invention.

FIG. 1 shows a reverse vending apparatus where certain parts, inter alia, the front panel, have been removed in order to make some details more visible. The reverse vending apparatus consists of three main sections 100, 200 and 300. The main section 100 has an insertion opening 101, wherein containers, such as empty bottles of glass or plastic, optionally containers in the form of empty cans made of glass, plastic, metal or wood, can be placed on a V-shaped conveyor 102 consisting of an inclined conveyor belt 103 which is driven over a pair of rollers 104, 105 by means of a motor 106. The V-shaped conveyor also has an inclined, stationarily positioned sliding surface 107. The sliding surface may be equipped with a metal detector 108. A video camera 109 is placed such that it looks down towards the conveyor 102, for example, through a window or opening 110. The reverse vending apparatus will be especially useful in connection with the payment of return deposits, where a user will be able to insert containers onto the conveyor 102 and request a receipt for the accepted containers by pushing a control button 111. A receipt will then be supplied via an opening in a printer 112, so that the receipt can be exchanged for cash. Alternatively, the printer can be replaced by a coin dispenser. As a further alternative or supplement, a device is conceivable wherein the apparatus user can selectively determine that the return deposits are to be donated to a charity, e.g., the Red Cross, SOS-Kinderdorf, the Salvation Army or the like.

To direct a user of the apparatus, it will be advantageous to use at least one display 113. However, in addition there can be provided, e.g., a further display 114. Both the displays can, e.g., be of the LCD type. In those cases where it is desirable to return a container to the apparatus user, there is located in the front portion of the section 100 a return opening 115 which communicates with the section 200 where sorting out can take place.

The section 100 may further contain a loudspeaker 116 for signalling messages to the user of the reverse vending apparatus or to give audio signals which summon the attention of the user or the maintenance staff.

In order to detect whether a container is inserted into the reverse vending apparatus with some contents, e.g., residual liquid, or contains other foreign bodies, there may be provided, e.g., a load cell 117 arranged on the stationary part 107 of the conveyor 102. However, as will be described below, there will also be other facilities for detecting whether a container that is inserted contains a substance, e.g., liquid, or not.

Figure 2:
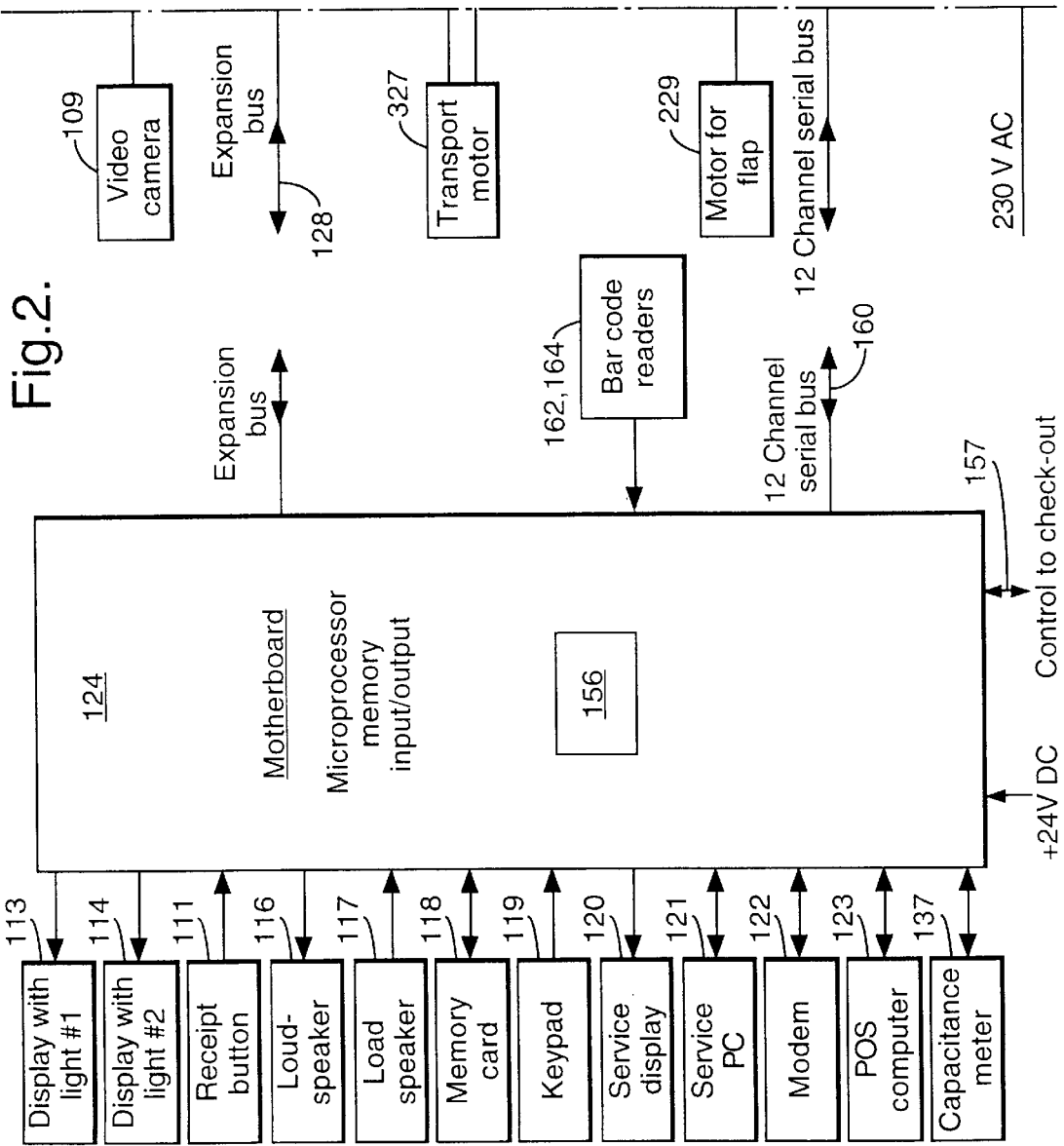
FIG. 2 and the continuation FIG. 2A show in simplified block diagram form the circuit structure in a reverse vending apparatus as shown in FIG. 1.

To be able to ensure that there is an efficient handling of the apparatus in the event of faults or maintenance and system control, it would be advantageous to provide a memory card device which makes it possible to exchange information with a computer in the apparatus by using special data cards. In this connection, it will also be necessary, for example, for testing, starting and stopping the reverse vending apparatus or other relevant operations, to provide the apparatus with a keypad 119. A display 120 for maintenance and repair staff can be provided in the apparatus, preferably in section 100, in connection with a suitable computer 121. Conceivably, the reverse vending apparatus may also be connected to a modem, so that data can be tele-transmitted to and from the apparatus, e.g., in connection with fault reports or fault repair of simple faults. In FIG. 2 the modem is indicated by means of the reference numeral 122. Furthermore, it is possible to provide a point-of-sale (POS) computer 123 in the shop of the business location where the reverse vending apparatus is located. A computer of this kind might be useful for statistical purposes, communication with check-outs in a shop or supermarket, or to ensure that a receipt that is cashed in at a check-out cannot be cashed in again.

The said functional members 113, 114, 111, 116–123 are, as shown in FIG. 2, connected to a motherboard 124 which contains a microprocessor, a memory and input and output units for data to and from the motherboard. The motherboard and thus also the said members 113, 114, 111, plus 116–123 are supplied with working voltage, e.g., +24 V DC via the motherboard. The motherboard 124 communicates with a video capture card 125, a motor control card 126 and a motor auxiliary card 127 via an expansion bus 128. The video capture card 125 receives input from the video camera 109. The video capture card may contain a digital signal processor, a video frame storage device, and means for input and output of data. The video capture card may be equipped with a lighting means 129 so as to be able to provide the right lighting in connection with the detection of the shape of a container.

Figure 3A:
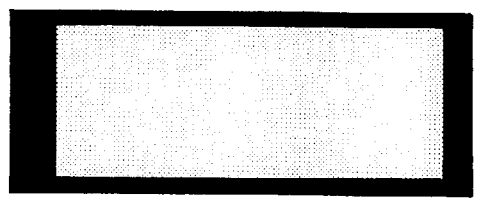
FIGS. 3a–3g show typical video images in connection with a detector station in the reverse vending apparatus according to FIG. 1.
Figure 3B:
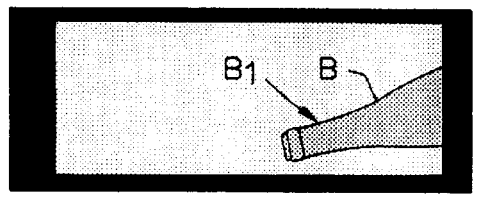
Figure 3C:
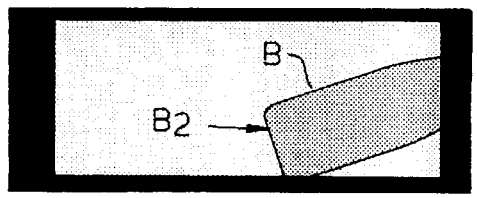

Broadly speaking, the video capture card 125 operates as a video picture analyser. Consequently, the video capture card 125 may have many functions, according to requirement in respect of what is to be analysed in the video image of the container which is captured by the video camera 109. According to the invention, the video capture card has an insertion analyser 130 which analyses the video image whilst the container is conveyed, in lying position and with its axis parallel to the direction of conveyance, past the video camera. Consequently, this insertion analyser may contain a calculator component and a control component. Before a container, e.g., a bottle, is put on the conveyor 102, the video camera 109 will show a video image essentially as shown in FIG. 3a. If the reverse vending machine is to function as intended, it is essential that the container is inserted bottom first. In FIG. 3b it is shown how an attempt is made to insert a bottle mouth (top portion or neck of bottle) first. When a container in the form of a bottle B is inserted top portion and neck B1 first, the calculator in this case has been inserted incorrectly. The control component which is included in the analyser 130 will cause the container B to be fed back to the insertion portion of the reverse vending apparatus at the start of the conveyor 102. A signal will be given to the apparatus user that he should turn the container so that the bottom of the container B is inserted first on reinsertion. When the container is inserted bottom first, the video image will appear approximately as shown in FIG. 3c. The bottom of the container, in this case a bottle, is indicated by means of the reference B2.

It is important to note that video images are taken continuously for ongoing monitoring of the position of an inserted container and also to observe the insertion of any other containers. The most ideal video image is selected by a circuit 136 for further analysis with a view to recognition and identification of the container. Such image analysis is generally described in technical literature.

It will immediately be understood that the video picture of the container will have varying appearance, depending upon the appearance of the container. FIG. 3a thus merely serves as an example to elucidate essential features of the use of a video camera to obtain a number of characteristic features of a container which is fed past the video camera 109.

If the starting point for the insertion has been as shown in FIG. 3c, the calculator component would have calculated that the container was moving into the video image with the container bottom B2 first, and thus cause the container to be conveyed further to a discharge station in either section 200 or section 300.

Figure 3D:
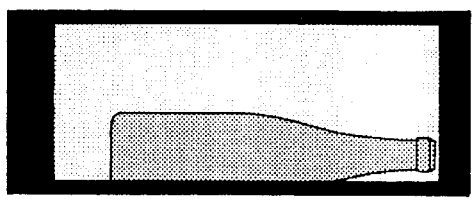

In FIG. 3d it is shown how the outer contour of the bottle is visible. The position which the container 3 has in the range of vision of the video camera is determined on the basis of the container's position in the video image. This can take place with the aid of a position detector 131 which constitutes a part of the video capture card. With the aid a position detector of this kind it is possible to establish where the container is relative of to the length of the detection zone, at the same time as the position detector 131 indicates separation between containers that are inserted.

The video capture card 125 preferably includes a container shape calculation circuit 132. On the basis of the video picture of the container, the circuit 132 is capable of calculating a characteristic expression of the shape of the container, such as the container's contour, surface area, cross-section or the like.

In those cases where the container B is a bottle of glass or plastic, it would be expedient to illuminate the bottle, e.g., with the aid of the lighting unit 129. The video camera 109 may expediently be a black and white camera, but use of a colour video camera is also conceivable. If a colour video camera is used, a colour determination circuit 133 which is included in the video capture card 125 can be put to use. The video capture card 125 may also contain a bar code reader 134 which is adapted to scan continuously a field of the video image in order to look for and register a bar code located on the container, indicated by means of the reference numeral 135 in FIG. 3e. The bar code will in a number of cases give indirect information with regard to, e.g., the colour of the bottle, so that use of a black and white camera is sufficient. The video capture card may also include, in connection with the bar code reader 134, a circuit which causes the container to be conveyed back to the insertion portion 115 of the reverse vending apparatus if the microprocessor 124 does not accept the container because of the bar code reading made by the bar code reader 134.

As shown in FIG. 1, a small gap will occur between the conveyors 102 and 201, i.e., between respective rotatory rollers 105 and 202. Conventional bar code sensors 162, 163 and 164 may be located in the gap, and where each will cover an area of detection on the container equal to about 120°.

Figure 3E:
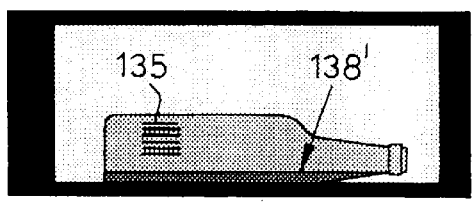

The reference numeral 138' in FIG. 3e denotes typical and possibly longitudinal markings in the video image of a container, which indicate that the bottle wholly or partly contains liquid. In the illustrated case a small residue is present in the bottle. This can be registered by a subcircuit 138. Owing to the varying weight of the bottle, it will be crucial to supplement the video image analysis with a weighing by using the load cell 117, and also a capacitance meter 137.

Figure 3F:
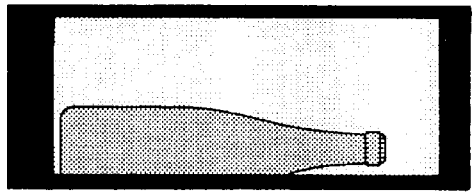
Figure 3G:
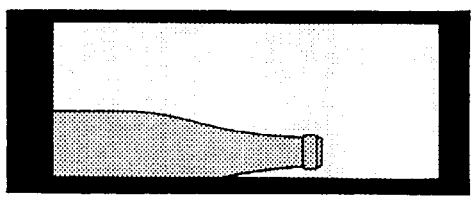

FIGS. 3f and 3g show the container, here in the form of a bottle, on its way out of the detection area.

The video capture card 125, with its subcircuits 130, 131, 132, 133, 134, 136 and 138, communicates with the motherboard 124 via the expansion bus 128, and the motor control card 126 is thus actuated via the motherboard 124. The same applies to the motor auxillary card 127.

FIG. 4 shows a flow chart in connection with some of the detection functions attended to by the video capture card. At block 139 there appears a new article in the form of a container B, as shown in FIG. 3b or FIG. 3c. If someone tries to insert a container from the back of the machine, e.g., from sections 200 or 300, block 140 will decide whether this happens or not. Thus, if a container is moved into the detection sector in such a way that it arrives from the left in the video images which are shown in FIG. 3, block 140 will emit an affirmative signal, which will set off an alarm at block 141 as an indication of attempted swindle. If this happens, the reverse vending apparatus will stop its function as shown in block 142, as in this case there must be a pause for the manual resetting of the reverse vending apparatus. If no attempt at swindle is made, so that the container, bottle or, e.g., can, is thus fed into the detection zone from right to left as shown in FIG. 3, the block 140 will emit a negative signal, which initiates at block 143 operation of insertion motor 106. In block 144 the insertion analyser 130 will decide whether the container is inserted bottom first. If this is not the case, a negative signal will be discharged from the block 144, which at block 145 initiates a message to the apparatus user to insert the container, in this example a bottle, "bottle bottom first". A message of this kind can, e.g., be shown on the display 113. Subsequently the insertion is stopped in that the motor 106 is stopped, as indicated by block 146. There is then a short pause whilst the apparatus user retrieves the container, that is, e.g., the bottle or can, for reinsertion, as is indicated by block 147. If it is established at block 144 that the container is inserted bottom first, an affirmative signal is emitted. Subsequently it is established at block 148 whether the container's top, in this case the bottle top portion, is visible or not. If the container top is not visible, as in FIG. 3d, a negative signal is emitted from the block 148, which via block 143 causes the insertion motor 106 to be run until the container top is visible. As further indicated by block 149 the container in this case is analysed and classified, e.g., by using one or more the circuits 130–134 and 136, 138. If the container, e.g, a bottle, is deemed to be accepted, as indicated by block 150, an affirmative signal is emitted. At block 151 the digital signal processor in the video capture card 125 asks whether the container has passed the detection area or the shape chamber. If the container has come as far in the video image as shown in FIG. 3g, the position detector 131 will emit an affirmative signal, which, as indicated at block 152, signals that the return deposit value is to be accumulated in the motherboard 124. Subsequently a "bottle processed" signal 153 is emitted.

If, after analysis and classification at block 149, a bottle or container is perceived as unacceptable in connection with block 150, a negative signal will go out from block 150 to a message block 154 which gives a "retrieve" message to the apparatus user. Furthermore, at block 155 the reversal of the insertion direction of the conveyor 102 will be initiated. There is then a pause, as indicated by block 156, for the removal of the container or bottle.

As is thus shown and described in connection with FIGS. 3 and 4, it will be understood that if a container, e.g., a bottle, is inserted incorrectly, i.e., mouth first, this will be detected in an efficient manner and measures likewise taken.

The section 200 of the reverse vending apparatus will now be described in more detail with reference to FIGS. 1, 2 and 5–9. This section of the apparatus is designed for sorting containers which are inserted and which pass through the section 100.

In FIG. 1 there is shown downstream of the conveyor 102 a further conveyor 201 which has a first rotatory roller unit 202 and a second rotatory roller unit 203. The first roller unit 202 has a stationary axis of rotation 204. The roller unit 202 is mounted in a fixed bracket 205. A first motor 206 is operatively connected to the roller unit 202 via a transmission 207. The motor 206 thereby causes rotation of the roller unit 202. Consequently, rotation of the second roller unit 203 is also effected in that a plurality of adjacently disposed elastic belts or bands 208, 209, 210 and 211 are provided, which run in grooves made for this purpose, such as the grooves 212, 213, 214 and 215 on the roller unit 203. The belts or bands 208–211 may, e.g., have a circular, rectangular, triangular or other polygonal cross-section. When the motor 206 rotates and moves the transmission 207 so that the first roller unit 202 rotates in its holder 205, the second roller unit 203 will rotate because of the movement of the conveyor belt 208–211. The second roller unit 203 is mounted in a holder 216.

Figure 6:
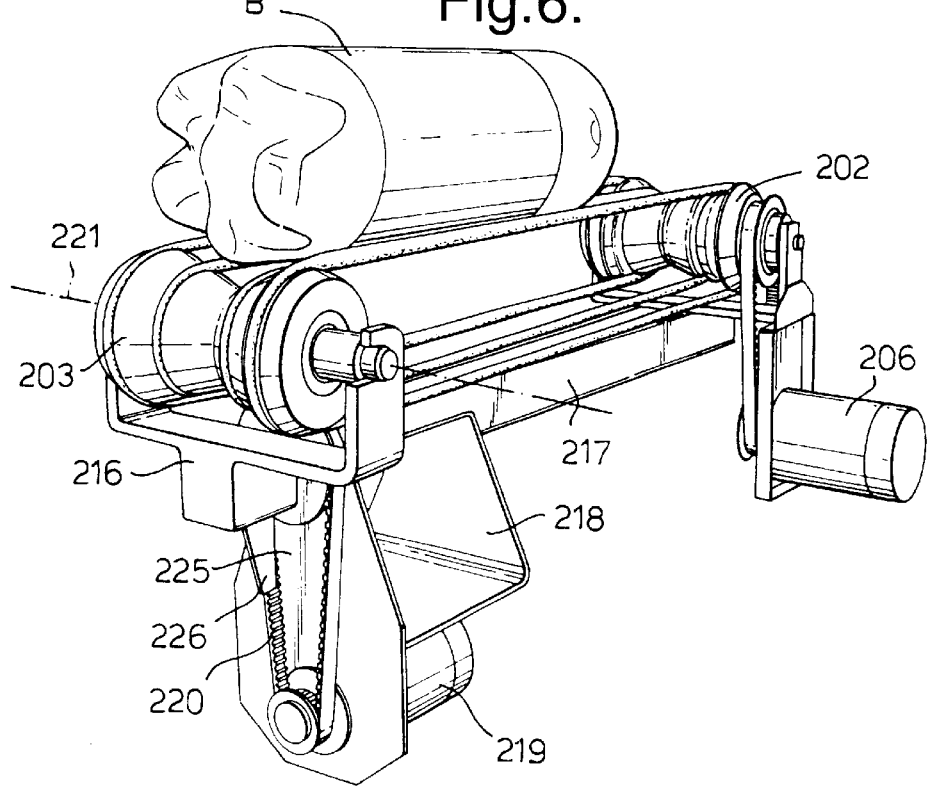

The conveyor 201 has a supporting frame 217 to which is secured a motor bracket 218 in which a motor 219 is suspended. The holder 216 is tiltable. The motor 219 will via a connection 220 be made capable of steering the tiltable holder 216 in one direction or another in a plane transverse of the conveyor 201 from a centre position (as shown in FIG. 6) where the axis of rotation of the second roller unit is parallel to the axis of rotation of the first roller unit. The axis of rotation of the second roller unit is in FIG. 6 denoted by the reference numeral 221.

Figure 7:
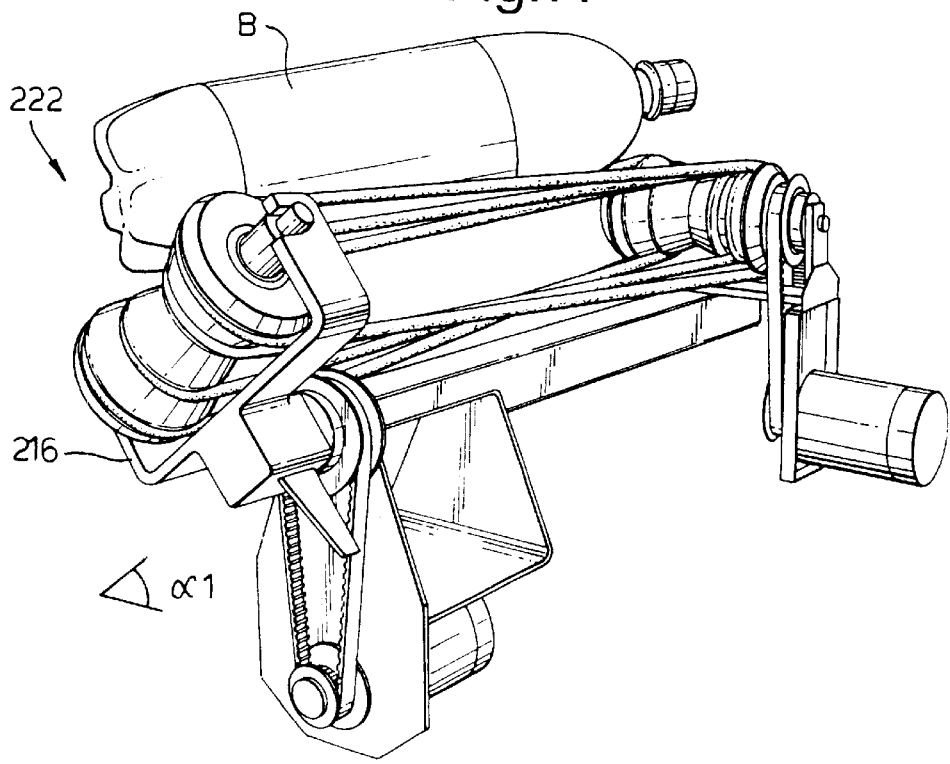
Figure 8:
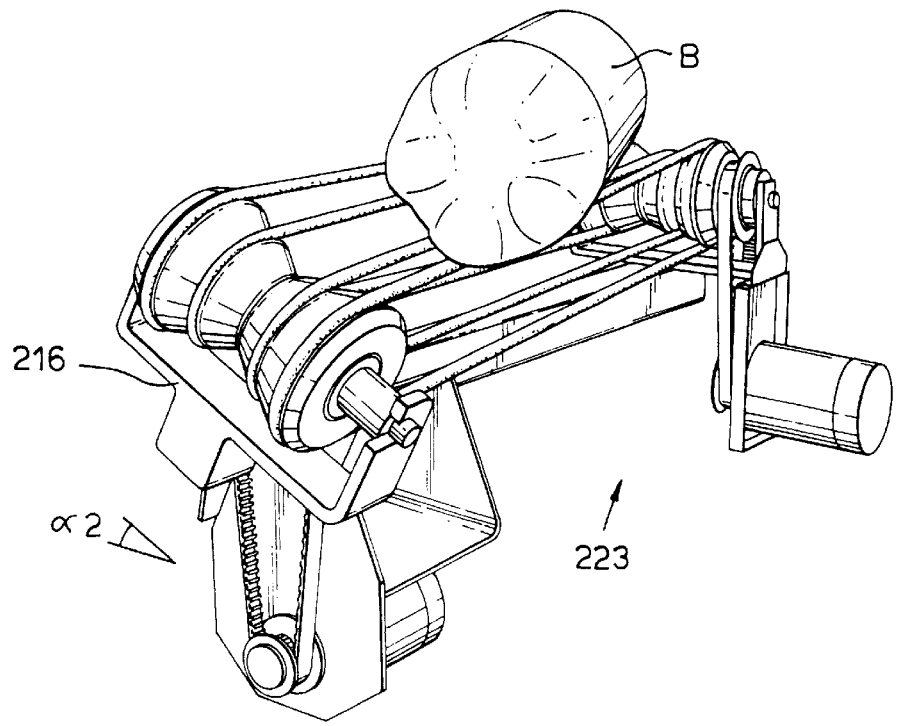
Figure 9:
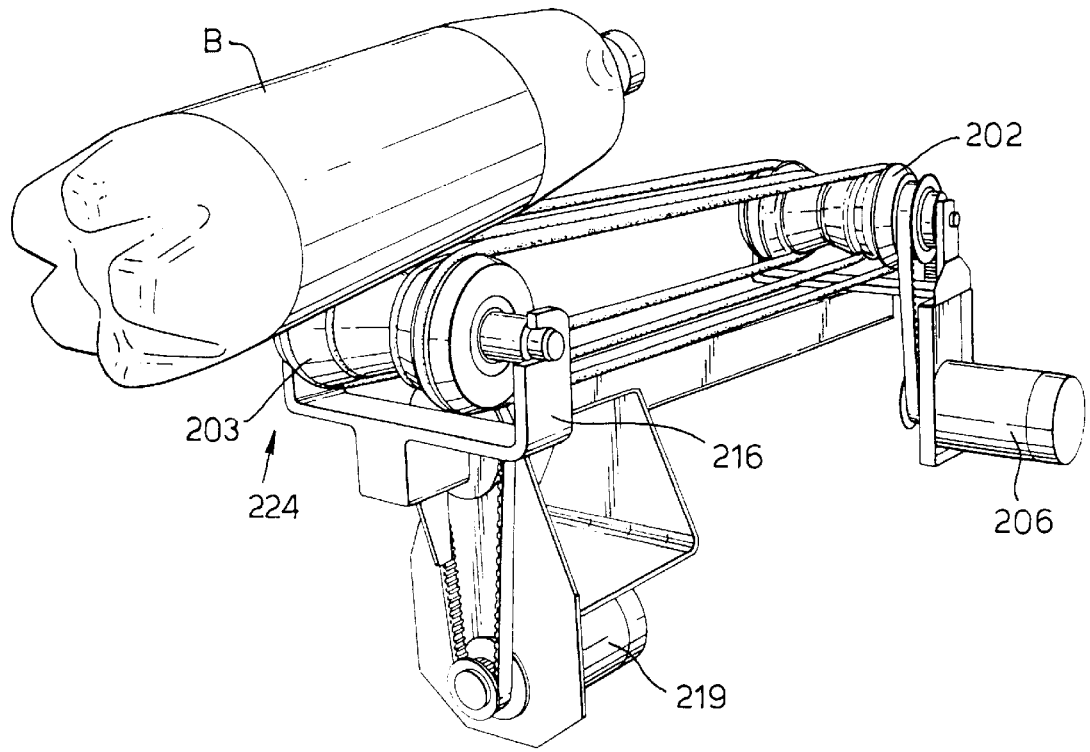

The detector unit, as represented by the motherboard 124 and the video capture card 125, contains a control circuit 156, advantageously provided on the motherboard 124, which control circuit 156, on the basis of data linked to the detectable container with a view to whether the container is to be sorted out in the station 200 or conveyed further, either actuates the second motor 219 to turn in order to tilt the second roller unit 203 holder 216 a certain angel ($\alpha 1$; $\alpha 2$) to one side or the other, as indicated in FIGS. 7 and 8 in order to cause a container of the type in question, e.g., B, which is lying on the conveyor 201 to be tipped to one side or the other to a first exit 222 as indicated in FIGS. 1 and 7, or to a second exit 223 as shown in FIG. 1 and indicated in FIG. 8. If the container, e.g., a bottler or a can, is not to be sorted out to the said exit 222 or 223, the container B is moved further at $\alpha 1=°2=0°$, in that the motor 219 keeps the holder 216 still in the centre position as shown in FIG. 6, so that the container is caused to leave the conveyor 201 at a third exit 224 downstream of the second roller unit 203, i.e., at the entrance to the third section 300 (see FIG. 9). If containers are discharged to the first exit 222, these will be fed via a chute to the exit 115 in the first section 100. These may be containers which have a defect or which under no circumstances can be accepted by the apparatus. Containers which are discharged to the second exit 223 may, e.g., be metal cans such as aluminium cans which are to be carried further for compaction in any case and do not need to be fed to the section 300.

The exit 223 may conceivably contain a controllable flap 228 driven by a motor or actuator 229. The flap 228 will thus in reality serve as an extra container sorter at the exit 223. Corresponding flaps may optionally be provided at the exit 222 (not shown in FIG. 1).

As is shown in FIGS. 5–9, the roller units 201 and 203 preferably have a double-cone configuration, a so-called "diabolo" shape. The motors 206 and 219 are preferably stepping motors.

Containers of metal which contain metal, e.g., steel, metal cans which wholly or partly contain or consist of steel or containers which contain foreign bodies will normally be sorted out to the first exit 222 for return to the reverse vending apparatus user, as such containers normally will not be accepted because they can neither be compacted, further treated or recycled. These must therefore be dealt with in another way.

If there is an increased sorting requirement, and in addition there is sufficient space at the installation site, it will be possible to connect two or more conveyors 201 one after the other, as indicated in FIG. 5*b* by means of the reference numerals 201, 201', 201". The number of sorting exits will thus be S=2N+1, wherein N is the number of conveyors.

Figure 13:
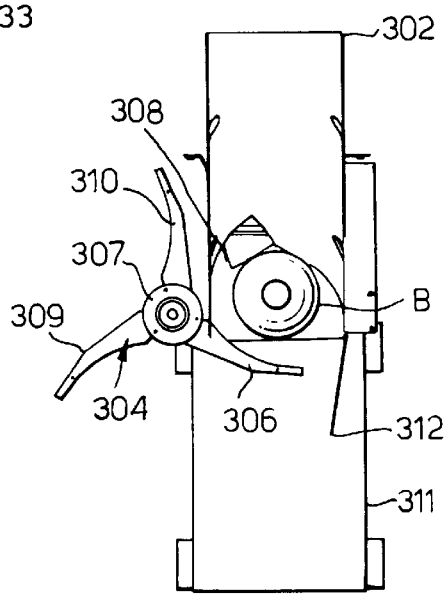
Figure 14:
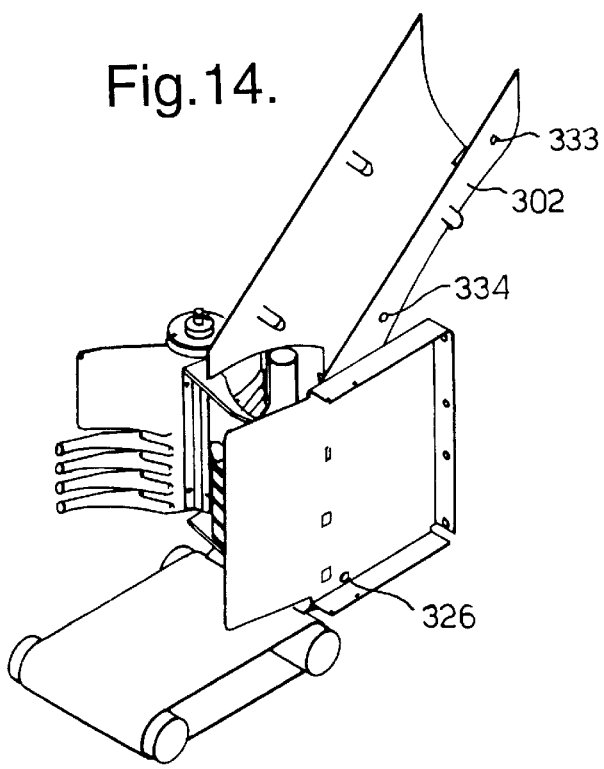
Figure 15:
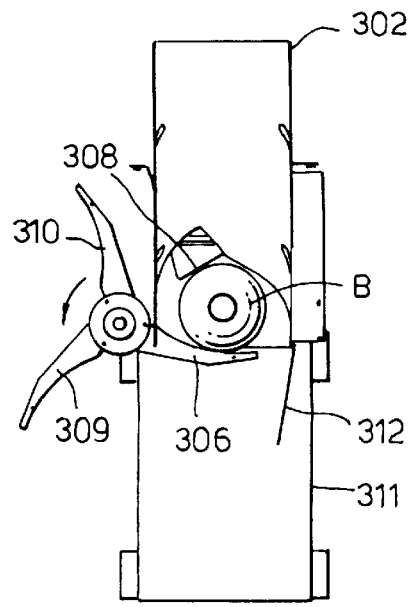
Figure 16:
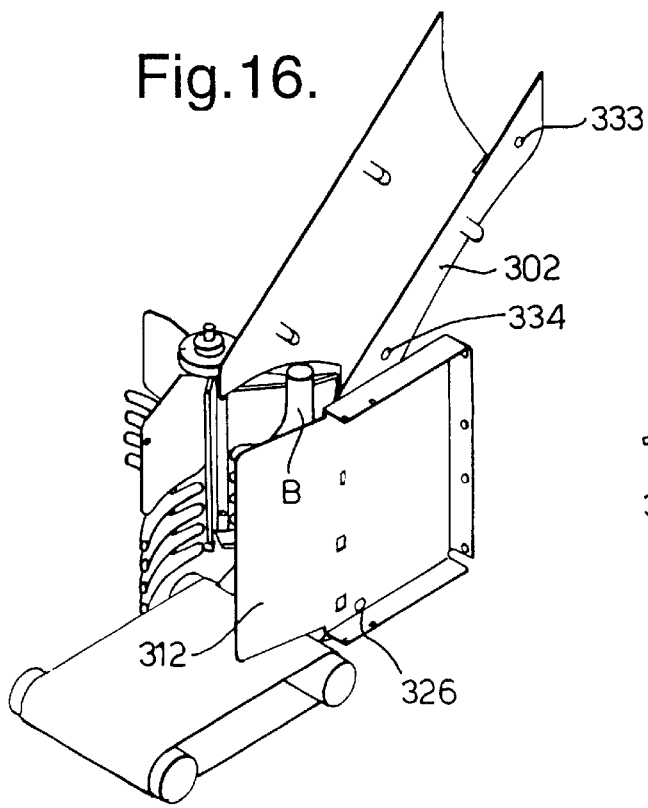
Figure 17:
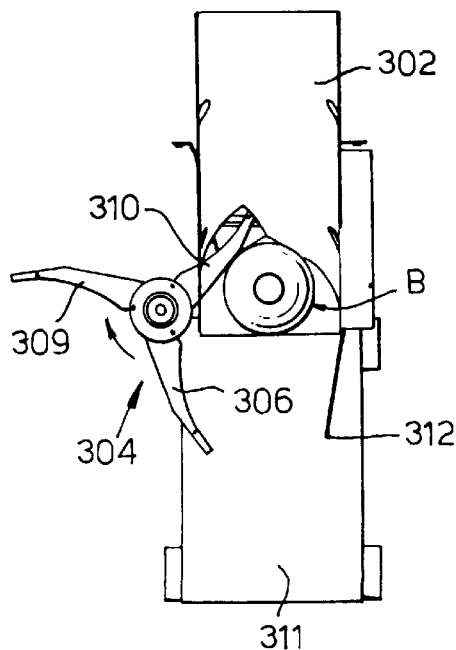
Figure 18:
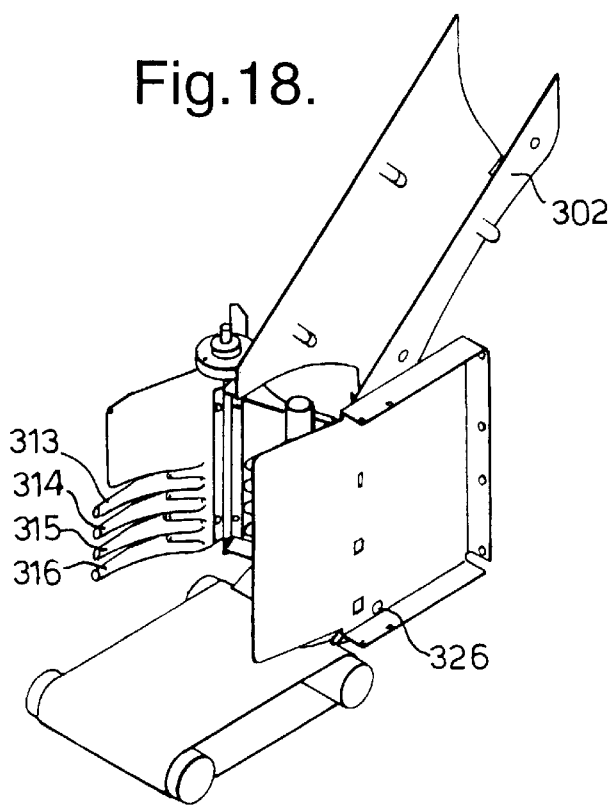
Figure 19:
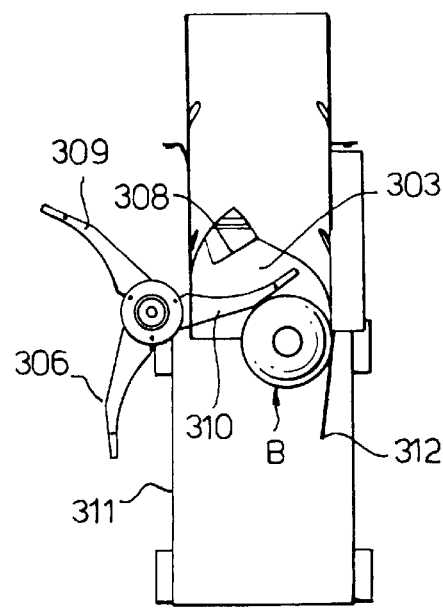
Figure 20:
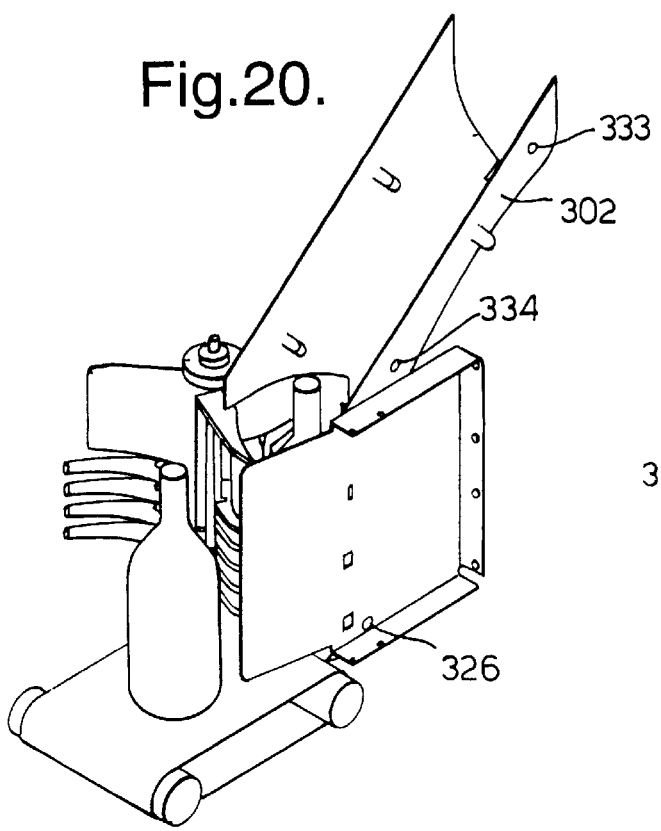
Figure 21:
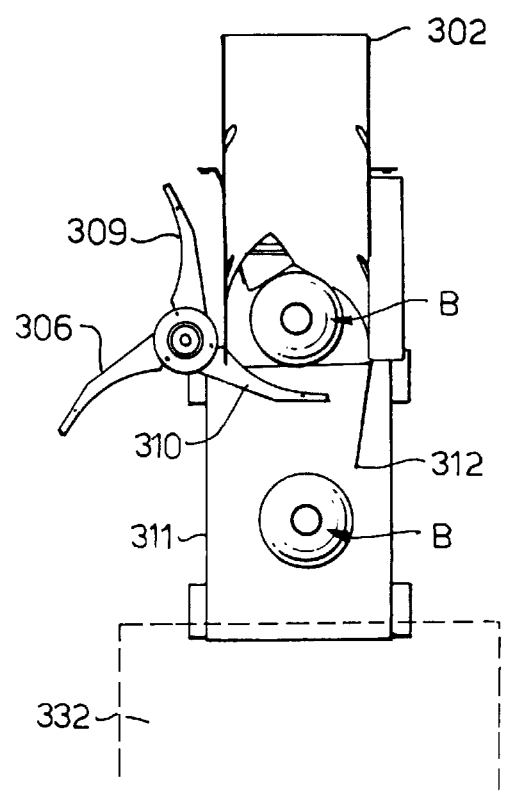
Figure 23:
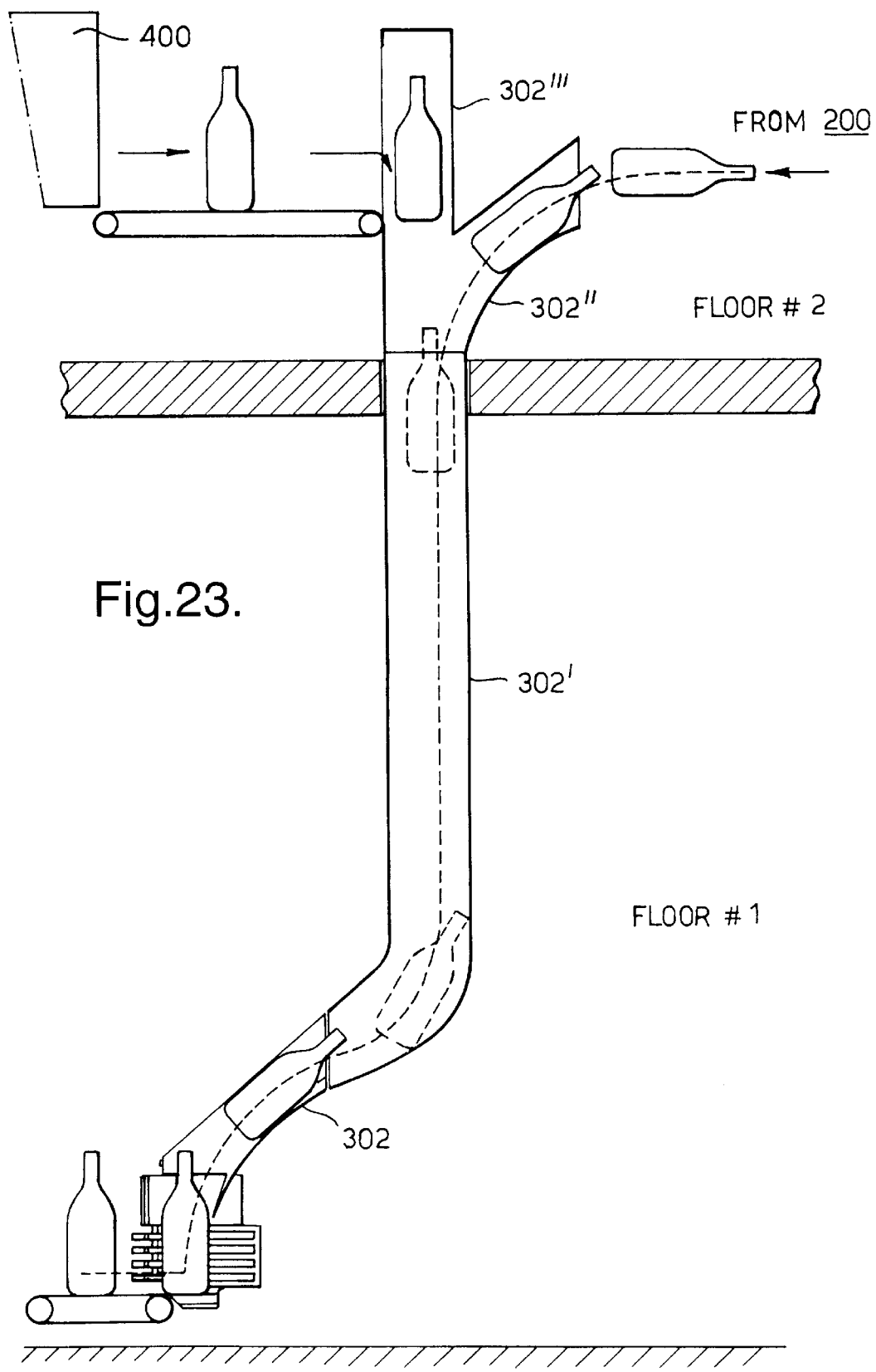
FIG. 23 shows a variant of the bottle raiser in FIGS. 10–21.

At the downstream end of the conveyor 201, there is provided according to the invention, a bottle raiser 310, with a view to conducting transported bottles B which arrive bottom B2 first from a lying position, as indicated to the right in FIGS. 10 and 11, to a vertical or standing position as shown clearly in FIG. 11. The bottle raiser comprises a curved guide duct or shaft 302 which provides a guide or slide for the bottle B and a shock absorbing rest 303. The guide duct 302 may be of different lengths and may be constructed to guide bottles across of distance of some meters, e.g., from one floor to a floor below, as indicated in FIG. 23. For this purpose the guide duct may have, e.g., an upright portion 302'. Uppermost the guide duct 302' may run into a curved portion 302" for transferring the bottles in lying position to the guide duct 302'. Alternatively, as indicated by mean of the reference numeral 302''', the bottle raiser may also conceivably be used for bottles which are discharged from a reverse vending apparatus 400 in standing position. The bottle will thus arrive in standing position with it bottom against the rest 303. Optionally, the rest 303 may be positioned horizontally. A bottle stabiliser indicated by means of the reference numeral 304 is operated by a stepping motor 305 (for the sake of simplicity only shown in FIG. 12). The bottle stabiliser 304 is a rotatable unit having at least one vertical wing 306 which is secured to a vertical spindle 307. In a first position of the bottle stabiliser, the wing shown in FIG. 13 will be in contact freedom with the bottle B as a function of data calculated by the motherboard 124 of the detector section relating to the bottle, e.g., diameter, height and weight, whereby the bottle B is capable of being guided freely down towards the rest 303. Then the wing 306, on control from the motherboard and thus via the motor control card 126, will be brought into a second position as shown in FIG. 15 in contact against a portion of the bottle and push the bottle B towards a back wall 308 in said duct or shaft 302. The bottle stabiliser 304 is made so that it also functions as a bottle ejector. For this purpose the bottle stabiliser can, for example, be equipped with additional wings, e.g., wings 309 and 310, the motor 305 on stabilisation as shown in FIGS. 14 and 15 turning, when seen from above, anti-clockwise, whilst the unit 304, as shown in FIG. 17, turns clockwise thereby causing the wing 310 to push the bottle B onto a further conveyor 311, preferably with the aid of a guide wall 312.

In a preferred embodiment, the combined bottler stabiliser and bottle ejector 304 is preferably equipped with three vertical wings. However, it will be understood that it is fully possible to use a smaller number of wings or perhaps a large number of wings if the bottle dimensions are small or the spindle 307 is some distance from the side of the guide duct or shaft 302.

In a preferred embodiment, the combined bottler stabiliser and bottler ejector 304 is preferably equipped with three vertical wings. However, it will be understood that it is fully possible to use a smaller number of wings or perhaps a large number of wings if the bottle dimensions are smaller the spindle 307 is some distance from the side of the guide duct or shaft 302.

Figure 12:
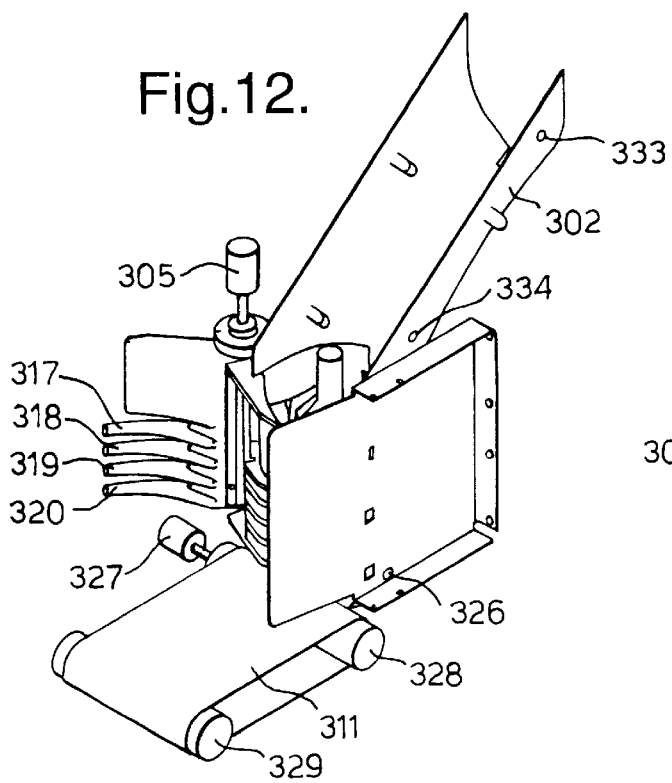

As can be seen clearly from FIGS. 10–12, 14, 16, 18 and 20, at least the lower portion of the wings 306, 309 and 310 are made having a plurality of fingers, such as the fingers 313, 314, 315, 316, for the wing 306 and the fingers 317, 318, 319 and 320 for the wing 309, as shown in FIG. 12. The fingers on the wing 310 are poorly visible in FIG. 20, but will have a design corresponding to those on the wings 306 and 309.

As can be seen from FIG. 11 in particular, the back wall 308 is also made having fingers 321, 322, 323, 324 and 325, so that the finger portions on the wings 306, 309 and 310 can pass between the mutual space between the fingers 321–325 of the back wall.

As can be seen from FIGS. 12–21, the respective wings 306, 309 and 310 in the rotating unit which constitutes both the bottle stabiliser and the bottle ejector are slightly curved.

This curve is desirable in order to ensure a controlled stabilisation and ejection. The wings 306, 309 and 310 have preferably the same angular separation.

Figure 22:
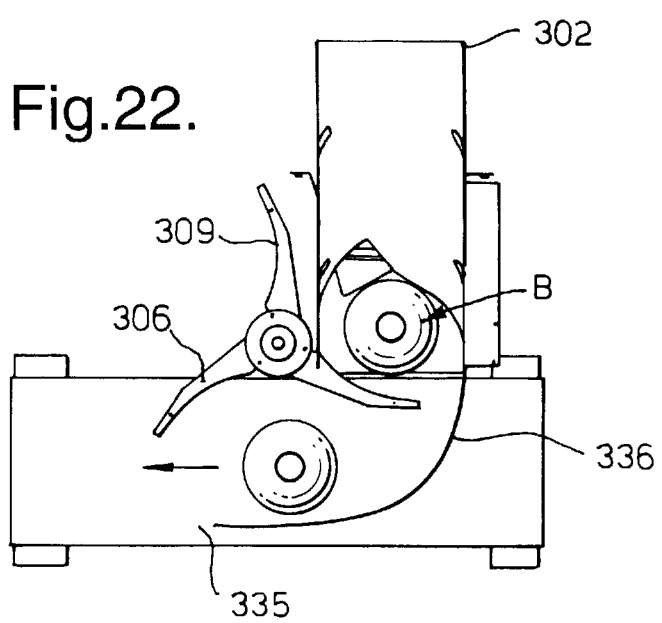
FIG. 22 shows a variant of the discharge solution from the bottle raiser.

Once the wing 310 has ejected a bottle B, a new bottle B comes into place on the horizontal rest 303 and is ready for stabilisation with the aid of the wing 310 which has just ejected the bottle. Thus, according to a preferred embodiment of the invention, it will always be the wing which has ejected the previous bottle which will have a stabilising effect on the next bottle. Thus, an efficient operation is achieved by the combined bottle stabiliser and bottle ejector 304. In order to register that a bottle comes into place on the rest 303, there may be provided at a lower portion of the guide, an arrival sensor 326 which views the space at the bottom of the guide or shaft 302. It is also possible to provide bottle position sensors, e.g., 333 and 334, along a higher portion of the guide or shaft 302. The conveyor 311 is driven by a motor 327, which for the sake of simplicity is indicated on only FIG. 12. The conveyor 311 will, with the aid of the motor 327, cause the ejected bottles to be transported further. The conveyor 311 may either convey the bottles in the same direction as they were conveyed through the sections 100 and 200, or provide transport in a transverse direction with the aid of a transversely positioned conveyor 335, as shown in FIG. 22. In this case the guide wall 321 should be extended and made having a curve as is shown by means of the reference numeral 336.

The motor 327 may either be a motor designed for continuous operation of a typical stepping motor. The conveyor 311 is operated in a known way per se over respective end rollers 328 and 329. As for the position sensor 327 in connection with the bottle raiser 301, it may also be expedient to provide the bracket 218 with a position sensor 225 which view an indicator 226 which is fixedly mounted on the tiltable holder 216. In this way a centre position for the holder 216 can always be accurately registered. Furthermore, it is possible to provide a position sensor 227 on the actual frame of the conveyor 201 close to the position of the holder 216, so that when the sensor 227 registers that a container bottom has reached the position of the sensor 227 and is to be thrown out to one side or the other as shown in FIGS. 7 and 8, respectively, the motor 206 is made to stop, whilst the motor 219 operates to tilt the holder 216 to one side or the other as shown in FIGS. 7 and 8.

From the motherboard 124 as shown in FIG. 2 there is a possibility of control to and from a check-out unit in a shop or supermarket, as indicated by the line 157. 230 V AC is supplied to a power supply 158 which gives out +24 V DC to inter alia the motherboard. In connection with the power supply there is provided a network distributor card 159 which is connected to a 12-channel serial bus which communicates with the motherboard 124, and where the bus is also connected to an in/out channel card 161 which on detection of, e.g., a stoppage in the discharge from the conveyor 311, as a result of a stoppage signal from a detector 330, emits a external alarm 331. The stoppage may be attributable to the fact that a collection table 332, which follows immediately after the conveyor 311, has become full.

Within the scope of the invention, as defined in the claims below, modifications of the individual embodiments will of course be possible without thereby departing from the inventive idea.

What is claimed:

1. A method for detecting containers having a top region and a bottom region, including bottles of glass or plastic that have a mouth at the top region, or cans made of metal, wood, glass or plastic which for the recycling of materials or reuse of the container, are transported in a lying position with their axes parallel to the direction of transport past a detection zone associated with a detector station containing a video camera, a video image analysis of the container being carried out, characterised by:

a) analysing a sequence of video images of the container while it is conveyed past the video camera, b) determining the position and movement of the container in a viewing region of the video camera on the basis of continuous detection of the position and movement of the container in the video images, and c) determining, during the movement of the container, by means of the images of the container which moves into the detection zone whether the container enters the video camera field of view either with its top region first or bottom region first, and causing the container to be fed back to a container insertion portion if it comes mouth first, and signalling the need to turn the container so that it is inserted bottom first when reinserted, or causing the container to be conveyed on to a discharge station if it comes bottom first.

2. A method as disclosed in claim 1, characterised in the further step of calculating on the basis of the video images of the container a characteristic expression of the shape of the container, including contour, surface area in the video image, and cross-section.

3. A method of disclosed in claim 1, characterised by producing color video images of a container which is a bottle of plastic or glass, and determining the color of the container in the video images based on the bottle's light transmissivity for light which is emitted in a cluster or wave lengths.

4. A method as disclosed in claim 1, 2 or 3, characterised by determining the most suitable video images with a view to recognition and identification of the container.

5. A method as disclosed in claim 1, characterised by continuously scanning a field of the video images of the container to search for and register a bar code located on the container.

6. A method as disclosed in claim 1, characterised by observing any longitudinal markings in the video image of a container which is a bottle emitting a signal indicating that the container wholly or partly contains liquid or another substance, and possibly returning the container to the user for emptying prior to reinsertion.

7. A method as disclosed in claim 6, characterised in that in addition the container is weighed and a capacitance measurement is carried out.

8. A method as disclosed in claim 1 or 6, characterised in that in addition it is analysed whether the container is of a specific metal type.

9. A device for detecting containers having a top region and a bottom region, including bottles of glass or plastic that have a mouth at the top region, or cans made of metal, wood, glass or plastic which for the recycling of materials or reuse of the container, are transported in a lying position with their axes parallel to the direction of transport past a detection zone associated with a detector station containing a video camera and, a video image analyser to provide a video image analysis of the container, characterised in that
  a) the video image analyser is connected to the video camera in order to analyse a sequence of video images of a container while the container is conveyed past the video camera, the video analyser containing:
  b) a position detector for determining the position and movement of the container in a viewing region of the video camera on the basis of continuous detection of the position and movement of the container in the video images,
  c) a calculator component for determining, when the container moves into the detection zone, whether the container enters the video camera field of view with its top region first or bottom region first, and
  d) a control component which causes the container to be fed back to a container insertion portion if it comes mouth first, and which has a signalling means for signalling the need to turn the container so that it is inserted bottom first when reinserted, or causes the container to be fed on to a discharge station if it comes bottom first.

10. A device as disclosed in claim 9, characterised in that in the analyser there may also be included a container shape calculation circuit which on the basis of the video images of the container is adapted to calculate a characteristic expression of the shape of the container, including its contour, surface area in the video image, and cross-section.

11. A device as disclosed in claim 9 or 10, characterised in that the video camera is a color video camera, that the container is a bottle of glass or plastic, that a lighting unit is provided to illuminate the container, and that the analyser contains a color determination circuit for establishing the color of the container in the video images based on the light transmissivity of the container to light which is emitted in a cluster of wave-lengths when the container is a bottle of glass or plastic.

12. A device as disclosed in claim 9 or 10, characterised in that the analyser contains a bar code reader which is adapted to scan continuously a field of a video image in order to search for and register a bar code located on the container.

13. A device as disclosed in claim 9 or 10, characterised in that the analyser contains a circuit which determines the best video image of the container with a view to recognition and identification.

14. A device as disclosed in claim 9, characterised in that the analyser contains a circuit which is adapted so that when it observes any longitudinal markings in the video images of a container which is a bottle it will emit a signal indicating that the bottle, wholly or partly, contains liquid or another substance.

15. A device as disclosed in claim 14, characterised in that said signal emission circuits is adapted to interact with a load cell to weigh the container and a meter for measuring a capacitance value of the container.

16. A device as disclosed in claim 9 or 14 or 15, characterised in that in connection with the detector station there is provided a metal detector.

17. A device as disclosed in claim 11, characterised in that the analyser contains a bar code reader which is adapted to scan continuously a field of a video image in order to search for and register a bar code located on the container.

18. A device as disclosed in claim 11, characterised in that the analyser contains a circuit which determines the best video image to the container with a view to recognition and identification.

19. A device as disclosed in claim 12, characterised in that the analyser contains a circuit which determines the best video image of the container with a view to recognition and identification.

20. A method for detecting containers having a top region and a bottom region, including bottles of glass or plastic that have a mouth at the top region, or cans made of metal, wood, glass or plastic which for the recycling of materials or reuse of the container, are transported in a lying position with their axes parallel to the direction of transport past a detection zone associated with a detector station containing a video camera, a video image analysis of the container being carried out, characterised by:
  a) analysing a sequence of video images of the container while it is conveyed past the video camera, and
  b) determining, during the movement of the container, by means of the images of the container which moves into the detection zone whether the container enters the video camera field of view either with its top region first or bottom region first, and causing the container to be fed back to a container insertion portion if it comes mouth first, and signalling the need to turn the container so that it is inserted bottom first when reinserted, or causing the container to be conveyed on to a discharge station if it comes bottom first.

21. A method as disclosed in claim 20, characterised in the further step of calculating on the basis of the video images of the container a characteristic expression of the shape of the container, including contour, surface area in the video image, and cross-section.

22. A method as disclosed in claim 20, characterised by producing color video images of a container which is a bottle of plastic or glass, and determining the color of the container in the video images based on the bottle's light transmissivity for light which is emitted in a cluster of wave lengths.

23. A method as disclosed in claim 20, 21 or 22, characterised by determining the most suitable video image with a view to recognition and identification of the container.

24. A method as disclosed in claim 20, characterised by continuously scanning a field of the video images of the container to search for and register a bar code located on the container.

25. A method as disclosed in claim 20, characterised by observing any longitudinal markings in the video images of a container which is a bottle, emitting a signal indicating that the container wholly or partly contains liquid or another substance, and possibly returning the container to the user for emptying prior to reinsertion.

26. A method as disclosed in claim 25, characterised in that in addition the container is weighed and a capacitance measurement is carried out.

27. A method as disclosed in claim 20 or 25, characterised in that in addition it is analysed whether the container is of a specific metal type.

28. A device for detecting containers having a top region and a bottom region, including bottles of glass or plastic that have a mouth at the top region, or cans made of metal, wood, glass or plastic which for the recycling of materials or reuse of the container, are transported in a lying position with their axes parallel to the direction of transport past a detection zone associates with a detector station containing a video camera, and a video image analyser to provide video image analysis of the container, characterised in that a) the video image analyser is connected to the video camera in order to analyse a sequence of video images of a container while the container is conveyed past the video camera, the video analyser containing:

b) a calculator component for determining, when the container moves into the detection zone, whether the container enters the video camera field of view with its top region first or bottom region first, and c) a control component which causes the container to be fed back to a container insertion portion if it comes mouth first, and which has a signalling means for signalling the need to turn the container so that it is inserted bottom first when reinserted, or causes the container to be fed on to a discharge station if it comes bottom first.

29. A device as disclosed in claim 28, characterised in that in the analyser there may also be included a container shape calculation circuit which on the basis of the video images of the container is adapted to calculate a characteristic expression of the shape of the container, including its contour, surface area in the video image, and cross-section.

30. A device as disclosed in claim 28 or 29, characterised in that the video camera is a color video camera, that the container is a bottle of glass or plastic, that a lighting unit is provided to illuminate the container, and that the analyser contains a color determination circuit for establishing the color of the container in the video images based on the light transmissivity of the container to light which is emitted in a cluster of wave-lengths when the container is a bottle of glass or plastic.

31. A device as disclosed in claim 28 or 29, characterised in that the analyser contains a bar code reader which is adapted to scan continuously a field of a video image in order to search for and register a bar code located on the container.

32. A device as disclosed in claim 28 or 29, characterised in that the analyser contains a circuit which determines the best video image of the container with a view to recognition and identification.

33. A device as disclosed in claim 28, characterised in that the analyser contains a circuit which is adapted so that when it observes any longitudinal markings in the video images of a container which is a bottle it will emit a signal indicating that the bottle, wholly or partly, contains liquid or another substance.

34. A device as disclosed in claim 33, characterised in that said signal emission circuit is adapted to interact with a load cell to weigh the container and a meter for measuring a capacitance value of the container.

35. A device as disclosed in claim 28, 33 or 34, characterised in that in connection with the detector station there is provided a metal detector.

36. A device as disclosed in claim 30, characterised in that the analyser contains a bar code reader which is adapted to scan continuously a field of a video image in order to search for and register a bar code located on the container.

37. A device as disclosed in claim 30, characterised in that the analyser contains a circuit which determines the best video image of the container with a view to recognition and identification.

38. A device as disclosed in claim 36, characterised in that the analyser contains a circuit which determines the best video image of the container with a view to recognition and identification.

* * * * *

UNITED STATES PATENT AND TRADEMARK OFFICE
CERTIFICATE OF CORRECTION

PATENT NO. : 6,137,900
DATED : October 24, 2000
INVENTOR(S) : Tom Steidel, Andreas Nordbryhn and Lennart Flem It is certified that error appears in the above-identified patent and that said Letters Patent is hereby corrected as shown below:

Column 1,
Line 54, change "bottle' light" to -- bottle's light --.

Column 4,
Line 22, change "of" to -- or --;
Line 62, after "calculator" insert -- component in the insertion analyser 130 will thus first determine that the container --.

Column 5,
Line 19, change "has" to -- had --.

Column 7,
Line 41, change "of" to -- to --.
Line 53, change "angel" to -- angle --.
Line 59, change "bottler" to -- bottle --.
Line 61, change "°2" to -- $\alpha\, 2$ --.

Column 8,
Line 12, change "201" to -- 202 --.

Column 9,
Line 11, change "large" to -- larger --
Delete lines 15-21, which are redundant with lines 8-14.
Line 67, change "of" to -- or --.

Column 10,
Line 5, change "view" to -- views --.
Line 66, change "of" to -- as --.

Column 11,
Line 3, change "or" to -- of --.
Line 12, after "bottle" insert -- , --.

UNITED STATES PATENT AND TRADEMARK OFFICE
CERTIFICATE OF CORRECTION

PATENT NO.   : 6,137,900
DATED        : October 24, 2000
INVENTOR(S)  : Tom Steidel, Andreas Nordbryhn and Lennart Flem It is certified that error appears in the above-identified patent and that said Letters Patent is hereby corrected as shown below:

<u>Column 12,</u>
Line 14, change "circuits" to -- circuit --.

<u>Column 13,</u>
Line 19, change "associates" to -- associated --.

Signed and Sealed this

Sixteenth Day of July, 2002

*Attest:*

*Attesting Officer*

JAMES E. ROGAN
*Director of the United States Patent and Trademark Office*